Oct. 10, 1939.  C. RASMUSSEN  2,175,763
SAW MACHINE
Original Filed May 9, 1936  2 Sheets-Sheet 1
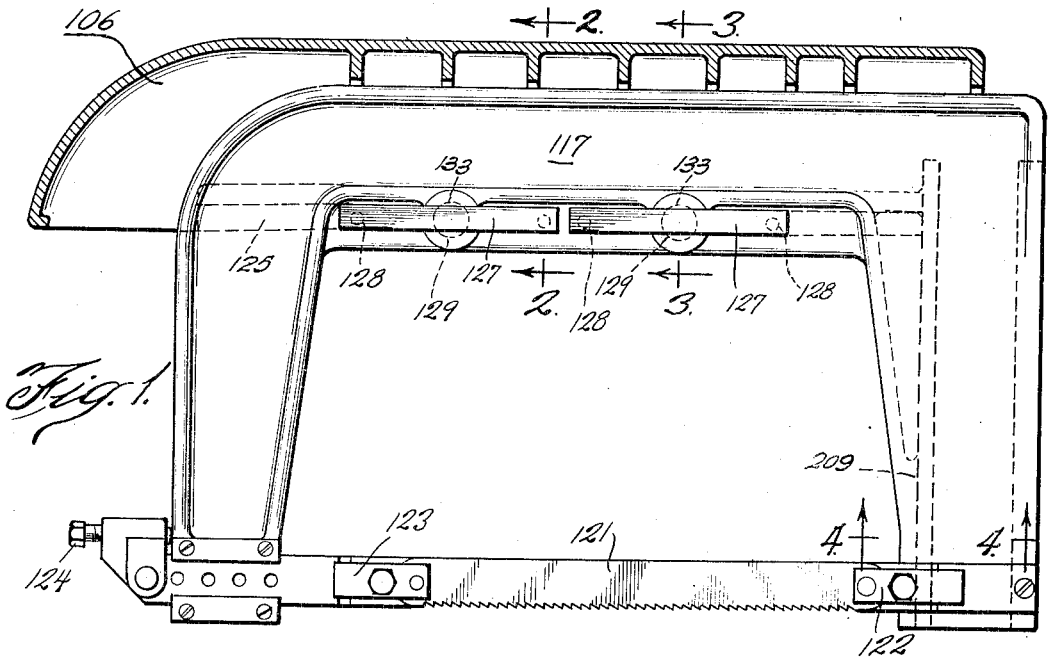
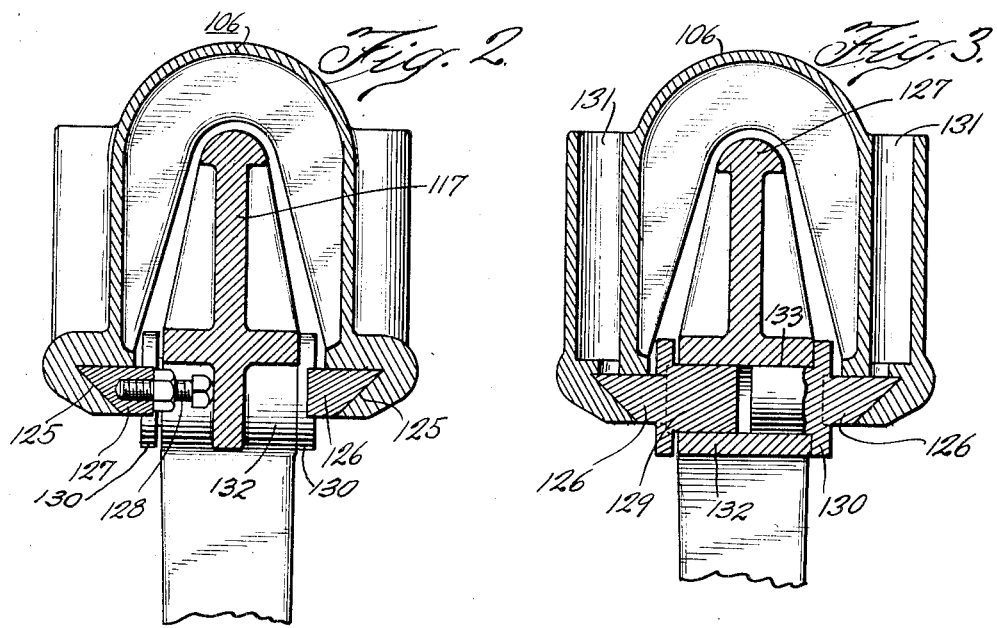
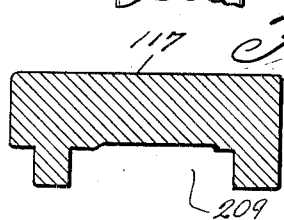
Inventor:
Charles Rasmussen
By John E. Gardner
Atty.

Oct. 10, 1939.  C. RASMUSSEN  2,175,763
SAW MACHINE
Original Filed May 9, 1936    2 Sheets-Sheet 2

Inventor
Charles Rasmussen
By John E. Gardner Atty.

Patented Oct. 10, 1939

2,175,763

UNITED STATES PATENT OFFICE 2,175,763

SAW MACHINE

Charles Rasmussen, Racine, Wis., assignor of one-half to John Oster, Racine, Wis.

Original application May 9, 1936, Serial No. 78,841. Divided and this application March 26, 1937, Serial No. 133,143

5 Claims. (Cl. 29—73)

The present invention relates in general to saw machines.

One of the objects of my invention is to provide an improved sliding mounting for power operated saws.

Another object is to provide a novel sliding cut construction for a power saw.

A further object is to provide an improved form of mounting for a power saw in which the torsional strain of the saw frame is substantially reduced.

Other objects of my invention will appear in the following detailed description taken in conjunction with the accompanying drawings.

The present application is a division of my co-pending application Serial No. 78,841, filed May 9, 1936 relating to Saw machines.

Fig. 1 is a side elevation of my improved saw mounting and frame therefor.

Fig. 2 is a cross section of the saw frame taken along the line 2—2 of Fig. 1.

Fig. 3 is a similar view taken along the line 3—3 of Fig. 1 looking in the direction of the arrows.

Fig. 4 is a section taken along the line 4—4 of Fig. 1 looking in the direction of the arrows.

Figure 5:
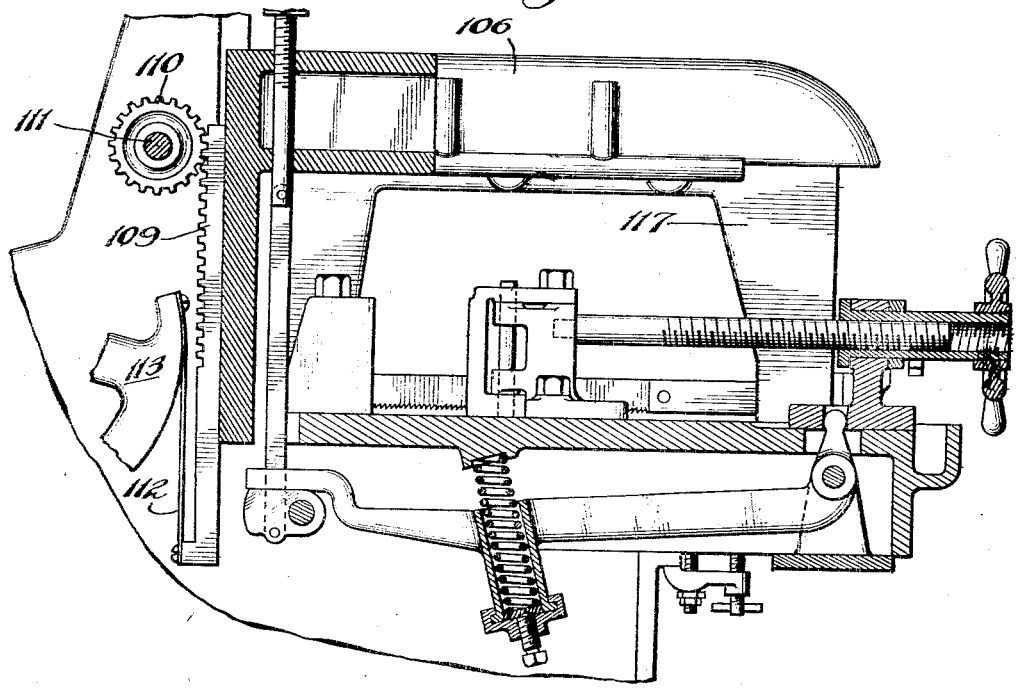
Fig. 5 is a fragmentary sectional elevation of the saw frame and its vertical adjusting means.
Figure 6:
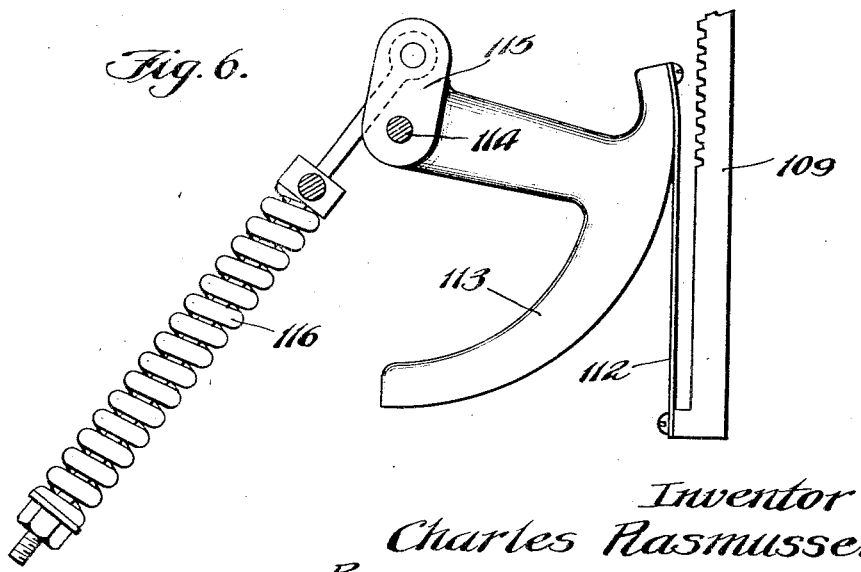
Fig. 6 is an enlarged detail of the saw counterbalancing mechanism partially shown in Fig. 5.

The accompanying drawings do not show the power mechanism for operating the saw.

It may be stated that one method of operating the saw is shown in my co-pending application heretofore referred to. It will suffice to state that vertical movement to the saw blade 121 is imparted through the main saw frame 106 and that horizontal movement to the saw blade is imparted by reciprocating the saw frame 117.

The vertical movement may be obtained by reason of the fact that the saw frame has secured thereto a rack 109 meshing with a spur gear 110 splined to a shaft 111. Any suitable source of power to drive shaft 111 may be provided. The lower end of the rack 109 has a steel band 112 suitably secured thereto, the other end of which is attached to an arcuate member 113 pivotally mounted at 114. The arcuate member has an extension 115 to which is secured an adjustable compression spring 116, the other end of which is mounted on the saw frame base (not shown). The compression spring 116 serves to counterbalance the weight of the saw frame 106 so that it may be moved easily by the rack 109 and the pinion 110 which function to raise and lower the saw frame so as to bring the saw into contact with the work.

The saw frame 106 provides a horizontally slidable mounting for the inner hack saw frame 117 which carries the adjustable saw blade 121. The saw blade 121 is suitably held by a member 122 attached to the frame 117 and an adjustable member 123 and is adapted to be tensioned by an adjustable screw 124.

The inner saw frame 117 slides in channels 125 in the saw frame 106. The frame 117 carries bearing members 126 cooperating with one channel 125 and adjustable bearing members 127 cooperating with the other channel 125. Each of the bearing members 127 are adjustable by means of the bolts 128. There are two bearing members such as 127, each of which are connected to the saw frame 117 by circular extensions 129. Similar circular extensions 130 are provided on the slides 126 and both parts 129 and 130 are rotatably mounted in the circular openings 133 which extend through bosses 132 formed in the upper horizontal portion of the inner saw frame 117. The saw frame 117 thus contacts the bearing members 126 at only two points and these points are in the openings 133. There are four of the adjusting bolts 128 by which the bearing members 127 may be positioned in the frame 117 to provide compensation for wear. Oil holes 131 are provided for lubricating purposes in the outer saw frame 106. The construction of the bearing members and their mounting to cooperate with the inner saw frame 117 is such that should there be any bending of the upper portion of the inner saw frame 117 as a result of the adjustment of the tension of the saw blade 121, the frame 117 may bend without in any way altering the bearing contact in the slides 125 by bearing members 127 and 126, since movement of the saw frame 117 is permitted as it only contacts the bearing members at two points.

This improved form of sliding mounting is highly effective in power saws, and particularly when the saw is employed in the cutting of hard materials, since tensional strain of the frame 117, even to the extent of warping, will have no effect upon its sliding contact.

My invention may be variously modified without departing from the spirit and scope thereof as indicated in the appended claims.

I claim:

1. In a sawing machine, the combination of a saw frame, an inner saw frame mounted for horizontal reciprocating movement on the first saw frame, a saw blade carried by said inner frame, means for placing tension upon said saw blade and pivotally mounted parallel sides bearings between said frames adapted to compensate for the position of the inner frame in accordance with the tension placed upon said blade.

2. In a sawing machine, the combination of a saw frame, an inner saw frame mounted for horizontal reciprocating movement on the first saw frame, bearings between said frames to permit horizontal reciprocating movement, said bearings pivoted on said inner frame and mounted in parallel guides in said first saw frame, thereby adapted to compensate for limited vertical warping of the inner frame.

3. In apparatus of the class described, the combination of a supporting frame having a pair of spaced parallel horizontal track members, a saw frame mounted for horizontal reciprocating movement in said parallel track members, the cooperating members between said saw frame and said frame including pairs of bearing members pivotally connected to said saw frame and having parallel sided jib portions engaging said parallel tracks, said bearing members having adjusting means for spreading the same to engage said parallel tracks and being pivoted at two spaced points to permit limited warping movement of said saw frame.

4. In a sawing machine, the combination of a saw frame, means for vertically reciprocating said saw frame, an inner saw frame mounted for horizontal reciprocating movement on the first saw frame, a saw blade carried by said inner frame, means for placing tension upon said saw blade and pivotally mounted parallel sided bearings between said frames adapted to compensate for the position of the inner frame in accordance with the tension placed upon said blade.

5. In a sawing machine, the combination of a saw frame, means for vertically reciprocating said saw frame, an inner saw frame mounted for horizontal reciprocating movement on the first saw frame, bearings between said frames to permit horizontal reciprocating movement, said bearings pivoted to and adjacent the ends of one frame and mounted in parallel guides in the other, said bearings having portions complemental to said guides and thereby adapted to compensate for limited vertical warping of the inner frame.

CHARLES RASMUSSEN.